United States Patent [19]
Shoquist

[11] Patent Number: 5,823,558
[45] Date of Patent: Oct. 20, 1998

[54] TRAILER LOADING SUPPORT

[76] Inventor: William A. Shoquist, 14815 Oakland Beach Ave., Prior Lake, Minn. 55372

[21] Appl. No.: 792,489

[22] Filed: Jan. 31, 1997

Related U.S. Application Data

[63] Continuation-in-part of Ser. No. 496,134, Jun. 28, 1995, abandoned.

[51] Int. Cl.[6] ............................... B60G 3/02; B60S 9/04
[52] U.S. Cl. .................. 280/405.1; 254/420; 280/414.5; 280/475; 280/43.18
[58] Field of Search .............................. 280/405.1, 414.1, 280/414.5, 407, 475, 762, 764, 43, 43.17, 43.18, 43.2, 724, 767, 763.1, 43.19, 43.22, 43.23; 254/419, 420

[56] References Cited

U.S. PATENT DOCUMENTS

| Re. 32,736 | 8/1988 | Lovell . |
|---|---|---|
| 2,033,298 | 3/1936 | Pribil . |
| 2,446,321 | 8/1948 | Bartholomew . |
| 2,568,261 | 9/1951 | Stade . |
| 2,852,266 | 9/1958 | Wagner . |
| 5,087,063 | 2/1992 | Merrill, Jr. . |

FOREIGN PATENT DOCUMENTS

| 621873 | 5/1927 | France . |
|---|---|---|
| 1303991 | 8/1962 | France . |
| 155648 | 6/1932 | Switzerland . |
| 723758 | 2/1955 | United Kingdom . |

*Primary Examiner*—Anne Marie Boehler
*Attorney, Agent, or Firm*—Palmatier, Sjoquist, Voigt & Christensen, P.A.

[57] ABSTRACT

A load frame which mounts on a trailer between the trailer hitch connection and the trailer frame front cross member. The load frame is a wishbone-shaped structural unit which mounts to the trailer frame front cross member with a pivoting saddle on the two rear legs of the wishbone. The load frame includes a spindle mount connected to a wheel assembly and a retracting arm for engaging a retracting apparatus to adjust the relationship between the wheel assembly and the trailer frame. The spindle mount includes a suspension mechanism and a pivoting connection for the wheel assembly. The wheel assembly includes a spindle member which is slidably and rotatably attached to the spindle mount. A tire is rotatably attached to the wheel assembly. The tire extends downwardly from the spindle mount to roll along the ground and support a portion of the tongue weight of the trailer.

13 Claims, 5 Drawing Sheets

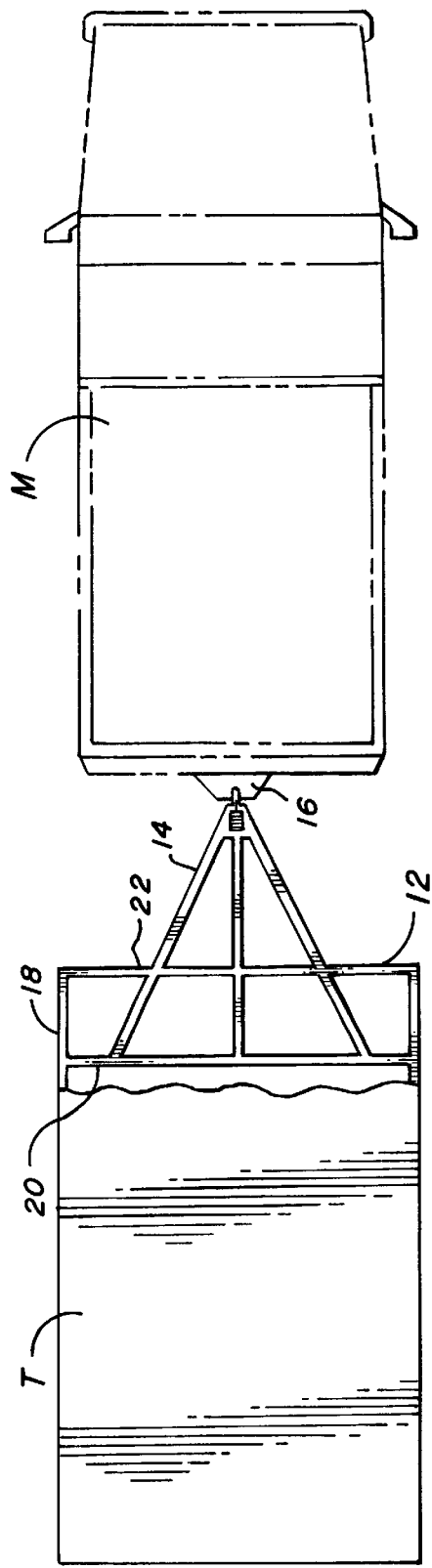
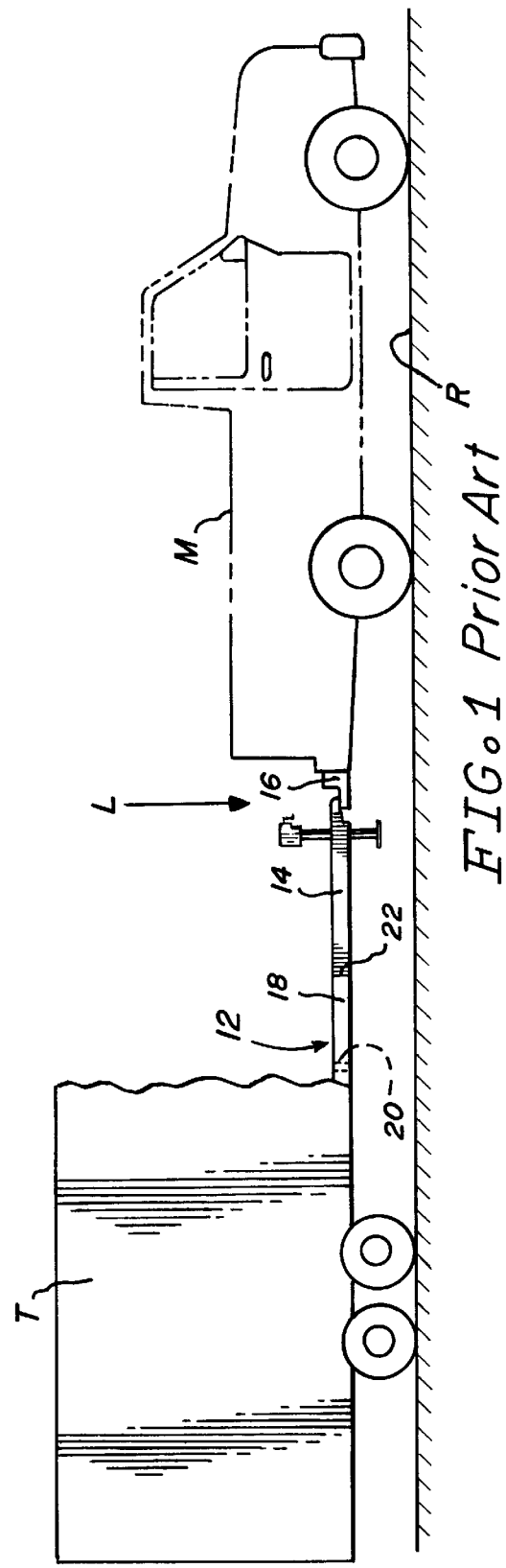

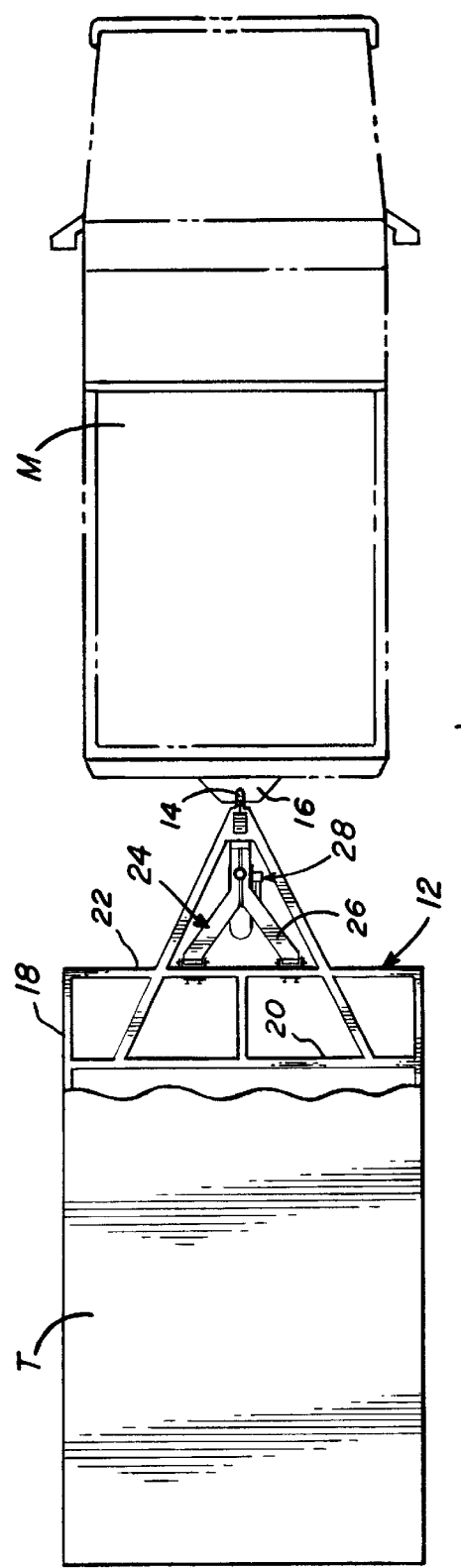
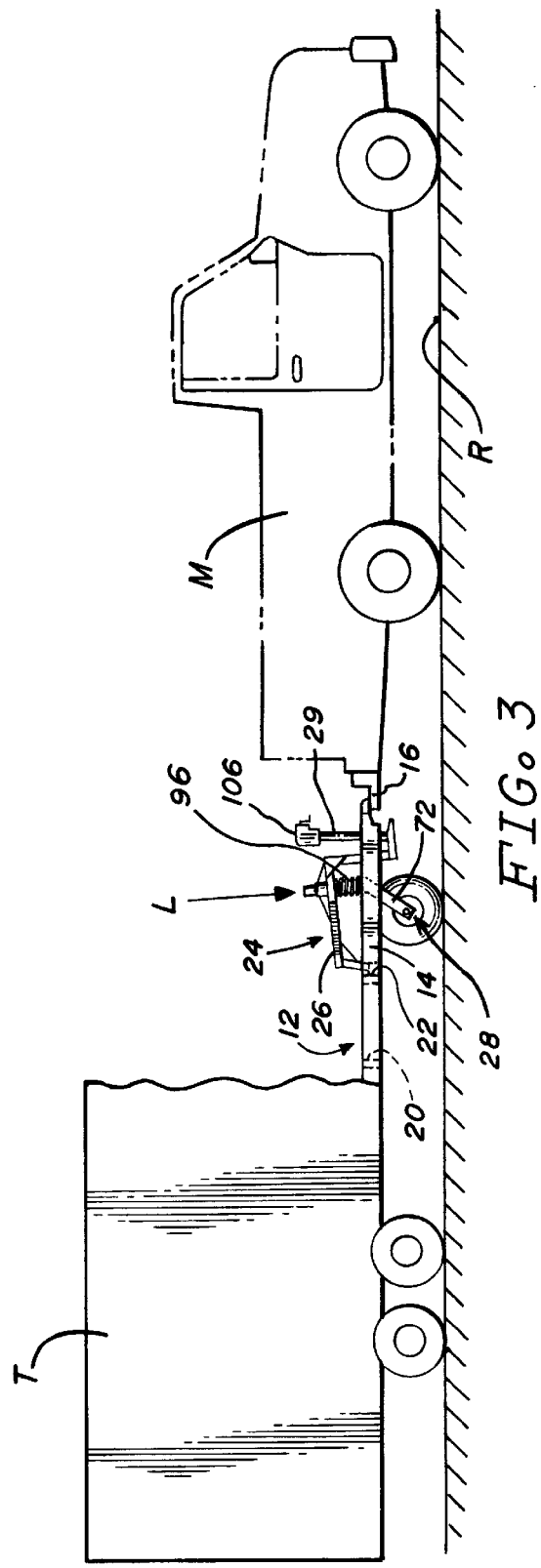

TRAILER LOADING SUPPORT

This is a continuation-in-part of U.S. application Ser. No. 08/496,134, filed Jun. 28, 1995, and now abandoned.

BACKGROUND OF THE INVENTION

This invention relates to improvements in connecting trailers to motor vehicles. Specifically, this invention relates to a device to relieve an overload condition on the trailer hitch of motor vehicles when such vehicles are pulling trailers.

Trailers are used to haul loads behind motor vehicles. Typically, trailers are used for boats, construction equipment, racing vehicles, construction equipment and other loads that are safer or more conveniently hauled behind a motor vehicle. The motor vehicle may be a car or pickup truck; however, motorcycles and motor homes may also be used to pull trailers. A motor vehicle must be adapted with a trailer hitch of some sort in order to pull a trailer. A trailer generally has a front portion called a tongue which is adapted to connect to a trailer hitch. The tongue of the trailer is connected to the trailer hitch when the trailer is to be towed. The trailer load is balanced so that a downward force exists at the trailer tongue to help secure the trailer to the motor vehicle. This downward force is called tongue weight and creates additional load on the suspension of the motor vehicle which may cause a danger if the force is too great. Most motor vehicles have a maximum tongue weight restriction of 350–500 pounds.

A great risk exists when trailers are loaded such that the tongue weight exceeds the limit prescribed for the motor vehicle. This situation will cause excess stress on the motor vehicle frame and may result in unsafe performance and handling of the motor vehicle. An excessive tongue weight on a motor vehicle may also reduce the traction on the front wheels of the motor vehicle resulting in reduced steering and braking effectiveness. Additionally, motor vehicles have been known to suffer structural damage to the body and frame as a result of excessive loads on the trailer hitch.

The present invention, as known, provides a device for relieving an overload condition on the trailer hitch of the motor vehicle due to imbalance of the trailer causing excess tongue weight. The invention, as known, modifies the connection between the trailer and the motor vehicle by adding a wheel assembly under the tongue of the trailer which will support a portion of the tongue weight.

SUMMARY OF THE INVENTION

The present invention improves the safety of towing a trailer behind a motor vehicle by adding a trailer load support to the tongue of a trailer. The invention includes a device which mounts on the trailer between the trailer hitch connection and the trailer frame front cross member. The device includes a main load frame which is a wishbone-shaped structural unit which pivotally mounts to the trailer frame front cross member with a pivoting saddle on the two rear legs of the wishbone. The load frame includes a spindle mount connected to a wheel assembly and a retracting arm for engaging a retracting apparatus to adjust the relationship between the wheel assembly and the trailer frame. The spindle mount includes a suspension mechanism and a pivoting connection for the wheel assembly. The wheel assembly includes a spindle which is slidably and rotatably attached to the spindle mount. The spindle is retained in place by a pin. The pin is inserted into one of a plurality of spindle holes in the upper spindle end. The suspension mechanism, such as a spring, strut, air bag, torsion bar or hydraulic shock bears against the main structure and against the wheel assembly to support the load and urge the pin to maintain contact with the spindle mount. The pin acts as a cam follower to ride on a cam surface formed on the top of the spindle mount. The pin riding on the cam surface allows the spindle to rotate within the spindle mount while urging the spindle into a predetermined position. A tire is rotatably attached to the wheel assembly and extends downwardly from the spindle mount to roll along the ground.

The pivot of the main structure, with the wheel assembly attached, about the pivoting saddle connection on the trailer front member is limited and controlled by a retracting apparatus such as a trailer jack, hydraulic or pneumatic cylinder. The retracting apparatus is mounted on the trailer frame and tiltably engages the retracting arm of the main structure to pivot the trailer load support so the tire alternatively engages or disengages the road. The retracting apparatus may be operated manually or by an automatic means.

It is an object of this invention to provide a relatively simple and inexpensive design which safely off loads weight from the trailer hitch of a motor vehicle while towing. It is another object of the present invention to provide a device which may be adapted to use an existing trailer jack for engaging the retracting member. It is yet another object of the invention to provide a device which may be operated without special tools.

It is another object of the invention to provide a device which may be adapted to existing trailers.

It is yet another object of this invention to provide a device to reduce the problem of excessive weight on the trailer hitch of a motor vehicle by modifying the trailer rather than the motor vehicle.

It is yet another object of the invention to provide a device which supports a portion of the load of the tongue weight of a trailer while not hindering the steering capability of the motor vehicle-trailer combination. It is yet another object of the invention to provide a device which may be retracted for special steering situations such as backing up. It is yet another object of the invention to provide a device which may be retracted from the load bearing position when not in use.

It is yet another object of the invention to provide a device which may be adjusted to support a predetermined portion of the tongue weight of a trailer while the trailer is moved at normal highway speeds.

A feature of the present invention includes a main structural device pivotally attached to the front cross member of a trailer. Another feature of the invention is a wishbone-shaped structural portion of the main structural device. Yet another feature of the invention is a pivoting saddle on each leg of the wishbone-shaped structural member connecting the main structural device to the trailer frame.

Another feature of the device is a spindle mount on the main structural device. Yet another feature of the invention is a wheel assembly slidably and rotatably mounted on the spindle mount. A further feature of the invention is a tire mounted on the wheel assembly and which rolls along the ground.

BRIEF DESCRIPTION OF THE DRAWINGS

FIG. 1 is an illustration of the prior art showing a vehicle loaded with a typical unsafe load and causing an imbalance in the motor vehicle.

FIG. 2 is an top view of the prior art with a portion of the trailer broken away to show the structural members of the trailer frame.

FIG. 3 is an elevation view of a vehicle pulling a trailer adapted with applicant's invention.

FIG. 4 is a top view of a vehicle pulling a trailer with applicant's invention and with a portion of the trailer broken away to show the structure of the trailer frame.

DETAILED SPECIFICATION

Figure 5:
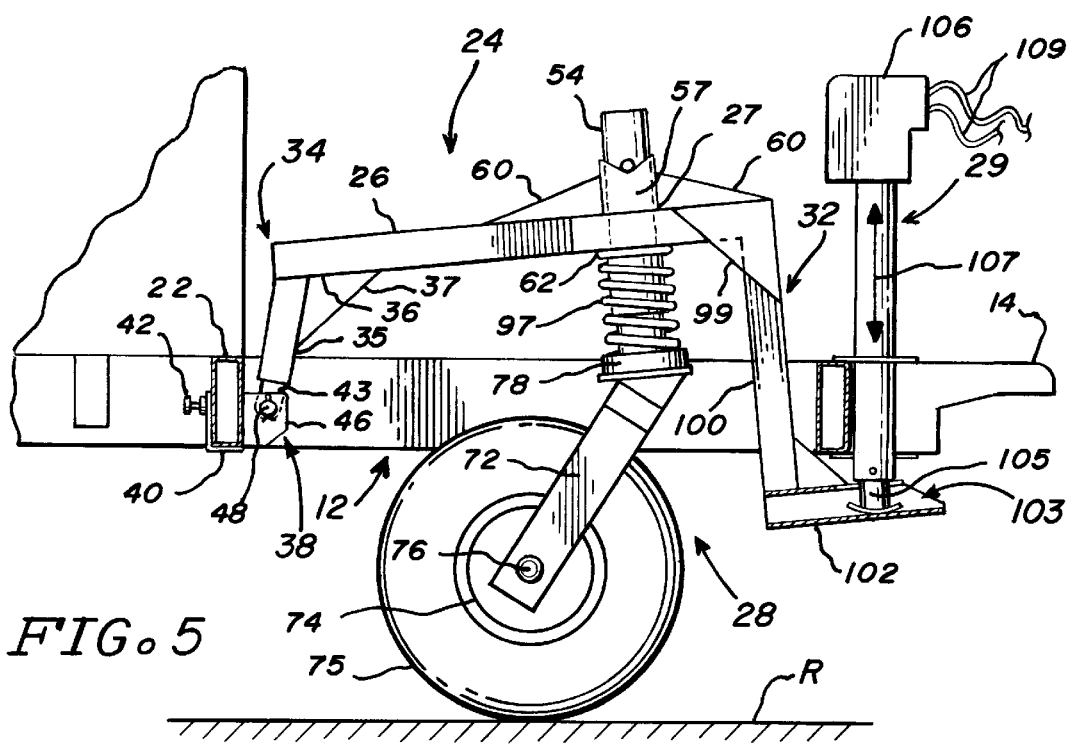
FIG. 5 is a detail side elevation view of the invention with a portion of the trailer frame removed and the tire assembly in the down position.

One form of the invention is illustrated and described herein.

FIG. 1 illustrates a prior art trailer T which is comprised of trailer frame 12 and tongue 14. Motor vehicle M is equipped with trailer hitch 16 which is connected to tongue 14 to allow trailer T to be towed. The tongue weight illustrated as load L in FIG. 1 bears down against tongue 14 which is mounted on trailer hitch 16 causing motor vehicle M to support load L. As can be seen from FIG. 1, load L may cause an imbalance in motor vehicle M and affect vehicle performance.

FIG. 2 illustrates a top view of motor vehicle M towing prior art trailer T with a portion broken away. Trailer T further comprises side frame members 18 and cross-frame members 20. Front cross member 22 is attached to tongue 14 and to side frame members 18.

FIG. 3 is an elevation view of a motor vehicle M towing trailer T with the trailer loading support, indicated in general by the number 24, installed on trailer tongue 14. Trailer loading support 24 comprises load frame 26, wheel assembly 28 and retracting apparatus 29.

FIG. 4 is a top view of motor vehicle M pulling trailer T with the trailer loading support 24. A portion of trailer T is broken away to show the relationship between trailer T, tongue 14 and trailer loading support 24. The wheel assembly 28 may rotate about the axis of spindle mount 27 to help the motor vehicle turn. Load frame 26 is also shown in FIG. 4 having a wishbone-shaped structural member 30 pivotally connected at front cross member 22.

Figure 7:
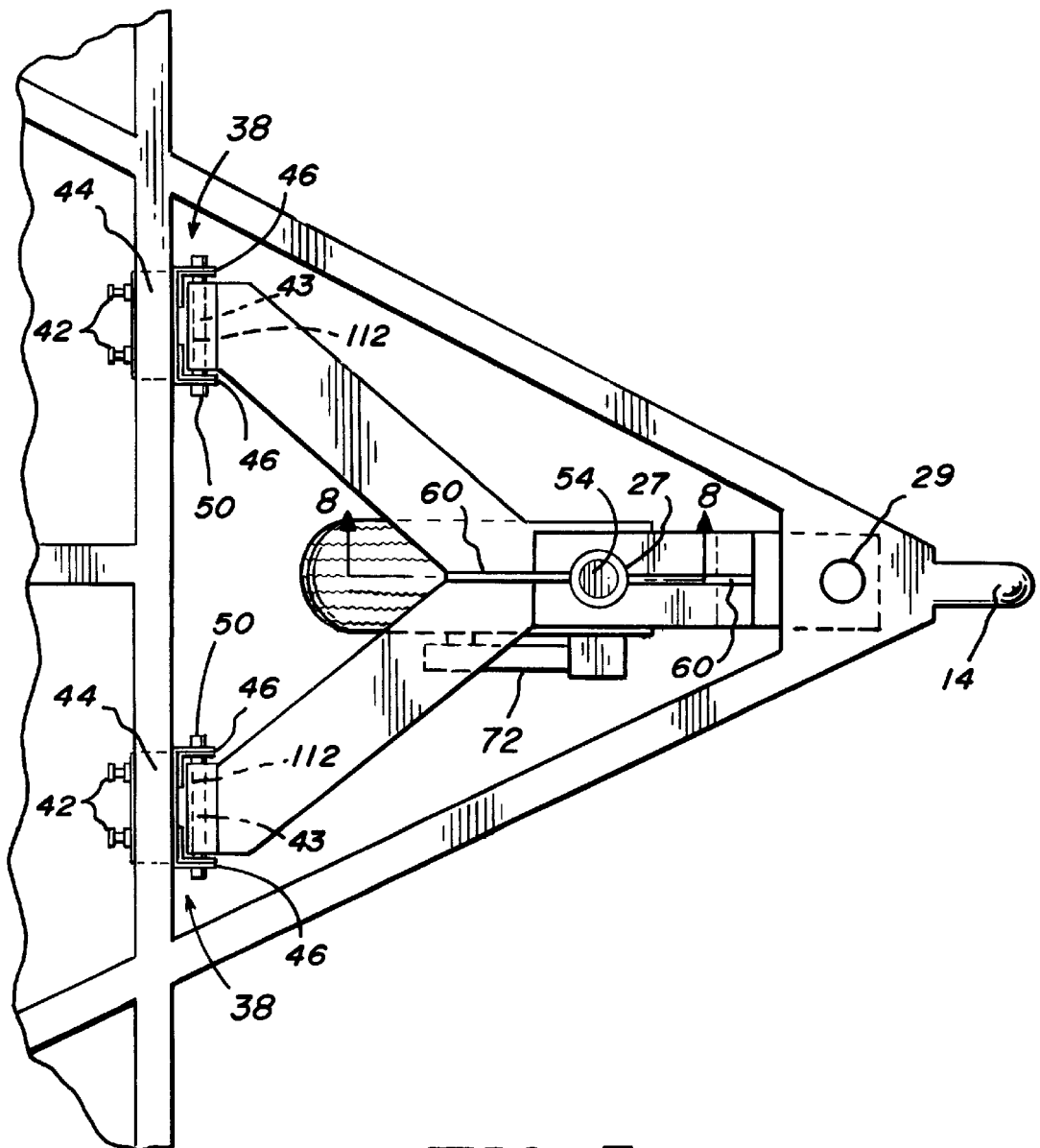
FIG. 7 is a top structural view showing the relative position along the load frame of the pivot points, spindle mount and retraction arm.

FIG. 5 illustrates a side elevation of trailer loading support 24. Load frame 26 has a front portion 32 and a rear portion 34. In the preferred embodiment, the rear portion 34 comprises two leg members 36, as shown in FIGS. 4 and 7. A foot 35 is attached to each leg member 36. Support brace 37 is welded to the foot 35 and leg member 36. A hole 43 is located at the bottom end of each foot 35, for pivotally connecting the trailer loading support 24 to the trailer frame 12.

The trailer loading support 24 is connected to the front cross member 22 of the trailer frame, by a pivoting saddle indicated in general by the numeral 38. The pivoting saddle 38 comprises a U-shaped frame bracket 40 which attaches to front cross member 22 and is held in place with a weldment or by bolts 42. Frame bracket 40 is designed to accept and surround front cross member 22 on three sides with the U-shaped bracket 40 attaching the saddle 38 to front cross member 22. Two support tabs 46 extend opposite bolts 42 from each U-shaped portion 44. A pivot pin aperture 48 is formed in each tab 46. The pivot pin apertures 48 are coaxial.

A pivot pin 50 (see FIG. 7) is inserted through the apertures 48 and the hole 43, pivotally connecting the trailer loading support 24 to the trailer frame 12 at each of the feet 35. Each foot 35 is aligned between a pair of tabs 46 on a saddle 38, with the hole 43 aligned with the pivot pin apertures 48. Each of the pivot pins 50 may be secured using conventional techniques to prevent longitudinal movement of the pivot pin.

Figure 8:
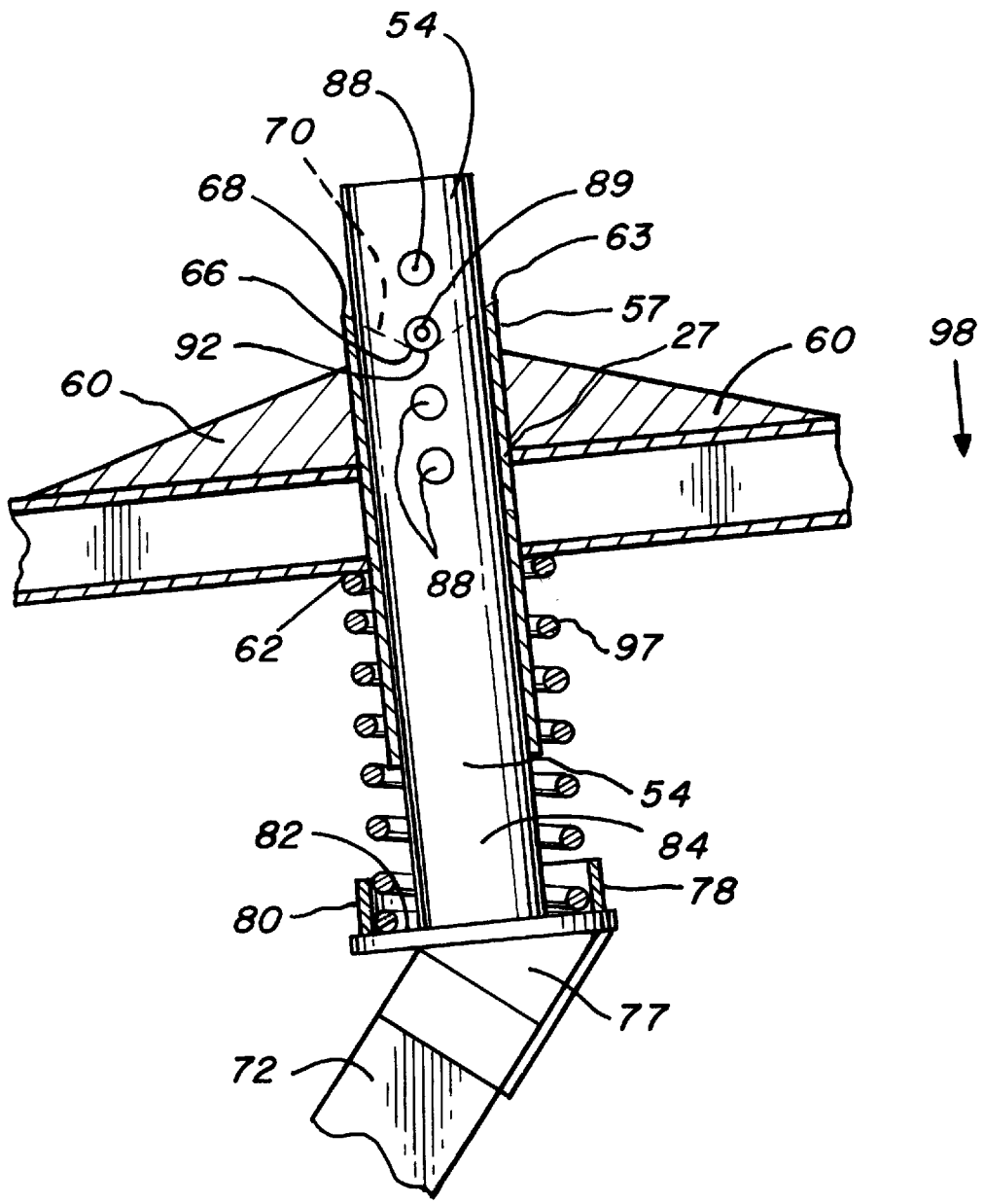
FIG. 8 is a section view taken at approximately 8—8 of FIG. 7.

FIG. 5 illustrates the wheel assembly indicated in general by the numeral 28 mounted on load frame 26 at spindle mount 27. The spindle mount 27 comprises a sleeve 57 welded to the load frame 26. Spindle 54 is slidably inserted in sleeve 57. A pair of support members 60 are weldably attached to load frame 26 and sleeve 57 to provide structural support for sleeve 57. A spring saddle 62 is formed at the intersection of the lower portion of load frame 26 and sleeve 57. Sleeve 57 has a top end 63 and a bottom end 64. Top end 63 extends above load frame 26 and a portion of the bottom end 64 extends below load frame 26. As best illustrated in FIG. 8, the top end 63 has a pair of detents 66 formed along the top surface 68. The detents 66 are formed along a diameter of the sleeve 57 and comprise cam surface 70.

As shown in FIGS. 7 and 8, wheel assembly 28 further comprises a spindle 54 and wheel support device 72 having a wheel 74 rotatably attached by an axle 76. The axle 76 is connected to the wheel support device 72. A tire 75 is mounted on wheel 74 to ride along the road surface R. A spring seat 78 is mounted on the wheel assembly 28. Spring seat 78 is preferably mounted on the spindle 54 at the intersection of the spindle 54 and wheel support device 72.

Spring seat 78 comprises spring holder 80 and wear pad 82 as illustrated in FIG. 8. Lower spindle end 84 of spindle 54 is attached to the upper portion 77 of wheel support device 72. Upper spindle end 86 has a plurality of spindle holes 88 which have parallel axes 89. Spindle 54 is of sufficient length to extend above top end 63 and allow a pin 92 to be mounted in one of the spindle holes 88. Pin 92 is used to retain spindle 54 in sleeve 57. Pin 92 also acts as a cam follower to ride along the cam surface 70 to urge spindle 54 in a predetermined orientation. The spindle holes 88 are aligned so that wheel assembly 28 is oriented in a predetermined direction when pin 92 is in the load position 94 along cam surface 70. Spindle 54 will pivot within guide tube 58 allowing wheel assembly 28 to rotate to accommodate turning of the motor vehicle M. As wheel assembly 28 rotates, spring 97 will bear against and ride along wear pad 82 and spring saddle 62. Pin 92 acting as a cam follower will ride along cam surface 70 to allow wheel assembly 28 to rotate. Spring 97 will urge pin 92 to return to the load position 94 when motor vehicle M has finished its turn.

Suspension mechanism 96 in FIG. 3 is coupled between load frame 26 and wheel assembly 28. The suspension mechanism shown in FIG. 5 is illustrated as a spring 97. It should be understood that other devices could be used as the suspension mechanism 96 such as a strut, coil-over shock absorber, torsion bar or an air bag. Spring 97 is mounted on spring seat 78 and bears against spring saddle 62. Spring 97 will urge spindle 54 in a downward direction as shown by the number 98 on FIG. 8 and urge pin 92 to bear against cam surface 70. Spring 97 may be compressed to support loads L of varying weight by placing pin 92 in an alternate spindle hole 88.

Figure 6:
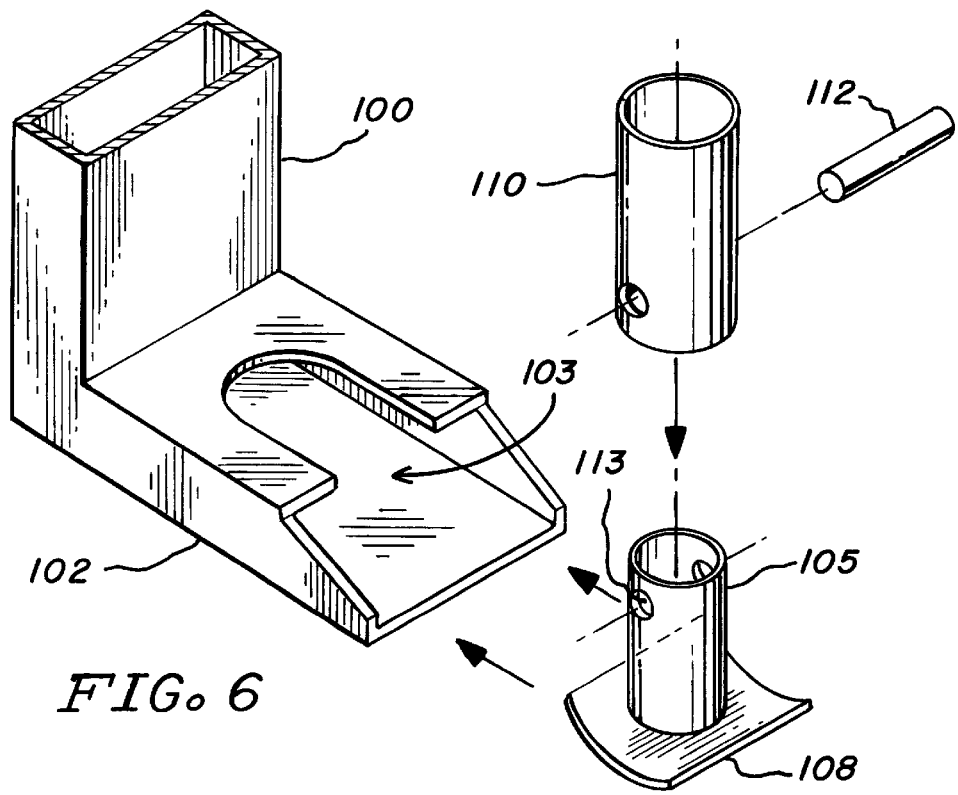
FIG. 6 is an exploded view of a portion of the load frame and retracting apparatus.

FIGS. 5 and 6 illustrate retraction arm 100 welded to the load frame 26. The retraction arm 100 comprises an L-shaped bracket having a retracting end 102. Support member 99 is welded to front portion 32 and retracting arm 100. Retracting arm 100 extends downwardly from load frame 26, and end 102 has a seat 103 formed thereon. Retracting apparatus 29 comprises an adjustment member 105 and an adjustment mechanism 106. Adjustment member 105 is loosely attached to the retraction apparatus 29 by a pin 112. Retraction apparatus 29 as shown in FIG. 5 may comprise a standard trailer jack which has a movable arm connected to adjustment member 105, which movable arm can be moved upward or downward as shown by arrow 107. It should be understood that adjustment mechanism 106 may include a hydraulic or pneumatic cylinder. Adjustment member 105 is extended from and retracted toward adjustment mechanism 106 to control and limit the movement of load frame 26 about pivot pin 50, to thereby cause tire 75 to engage road R and support a portion of the load L.

Adjustment member 105 has a curved foot surface 108 which slidably engages inside seat 103. Adjustment member 105 is loosely pinned to retracting arm 100 by a pin 112 which fits through holes 110 and 113. The foot plate 108 is slidably movable over the upper interior surface of end 102.

In operation, trailer loading support 24 is pivotally mounted to front cross member 22 of trailer frame 12. Wheel assembly 28 is rotatably and slidably mounted to load frame 26 by insertion of spindle 54 in the guide tube 58. Spring 97 is located between spring seat 78 and spring saddle 62 to urge pin 92 to ride along the surface 70 of sleeve 57. Pin 92 is inserted into a spindle hole 88 to secure spindle 54 and sleeve 57. Retracting apparatus 29 is fixably mounted to trailer frame 12.

After trailer hitch 16 is attached to tongue 14, the adjustment mechanism 106 is engaged, causing trailer loading support 24 to be pivoted around pivot pin 50 and causing tire 75 to engage the road surface R. As additional downward force is exerted by adjustment mechanism 106, adjustment member 105 bears down against retracting end 102 and a portion of load L on is transferred from trailer hitch 16 to wheel assembly 28. When the load L bearing down on wheel assembly 28 reaches a predetermined force, spring 97 is compressed and pin 92 may be repositioned to a different spindle hole 88. Motor vehicle M is then ready to pull trailer T with a safe, adjusted tongue weight bearing against trailer hitch 16.

Under certain conditions it may be desirable to retract adjustment member 105 toward retraction mechanism 106 and raise load frame 26 to cause the tire 75 to disengage road R. This feature is particularly useful when motor vehicle M is moving in reverse, or the trailer is empty, or when vehicle steering may be affected by trailer loading support 24.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is claimed is:

1. A device for reducing a load on a motor vehicle trailer hitch in combination with a rigid trailer frame, while the trailer is towed by the motor vehicle, comprising:
   (a) a load frame, the load frame having a top side, a bottom side, a front portion and a back portion, the back portion of the load frame pivotally connected to the trailer frame;
   (b) a wheel assembly comprising a sleeve affixed to the load frame and a spindle rotatably and slidably attached in the sleeve, and a tire rotatably attached to the spindle adjacent the bottom side of the load frame;
   (c) a suspension mechanism coupled between the wheel assembly and the load frame; and
   (d) a retracting apparatus, the retracting apparatus fixedly mounted to the trailer frame, and having an adjustment member bearing against the front portion of the load frame to thereby control and limit the pivot of the load frame about the pivotal connection to the trailer frame, to selectively adjust the loading on the trailer hitch.

2. The device of claim 1, wherein the load frame has a wishbone-shape, the load frame having a first leg on the front portion, a second and third leg on the back portion.

3. The device of claim 1, wherein the suspension mechanism comprises a coil spring.

4. The device of claim 1, wherein the retracting apparatus comprises a jack.

5. The device of claim 1, wherein the wheel assembly further comprises a tire support connected between the tire and the spindle, the spindle having a lower spindle end and an upper spindle end, the spindle connected to the tire support at the lower spindle end, the spindle rotatably and slidably movable in the sleeve connected to the load frame, intermediate the lower spindle end and the upper spindle end, a plurality of spindle holes in the upper spindle end of the spindle, the holes being spaced from each other.

6. The device of claim 5, wherein the wheel assembly lower spindle end further comprises a spring seat and a wear pad mounted on the spring seat.

7. The device of claim 5, wherein the sleeve further comprises a detent upper surface; and further comprising a pin removably mountable in any of the spindle holes on the spindle to bear against the detent surface and thereby limit the motion of the spindle in the sleeve.

8. The invention of claim 7, wherein the top end of the sleeve comprises a cam surface, the pin bearing against the cam surface as a cam follower to urge the spindle in a predetermined orientation.

9. A trailer towing support device comprising:
   (a) a load frame, the load frame having a top side, a bottom side, a forward portion and a rear portion;
   (b) a wheel assembly, the wheel assembly pivotally attached to the load frame, and having a tire rotatably connected to a tire support frame on the wheel assembly, adjacent to the bottom side of the load frame; the wheel assembly further comprising a spindle connected to the tire support frame, the spindle having a lower end and an upper spindle end, the spindle connected to the tire support frame at the lower spindle end, the spindle rotatably and slidable connected to the load frame intermediate the lower spindle end and the upper spindle end, a plurality of holes in the upper spindle end of the spindle, the spindle holes being spaced from each other; and
   (c) a suspension mechanism, the suspension mechanism bearing between the wheel assembly and the load frame.

10. The device of claim 9, wherein the load frame further comprises a spindle mount, the spindle mount having a sleeve, a top end and a bottom end on the sleeve, the spindle rotatably and slidably mounted in the sleeve with the tire adjacent the bottom end, the upper spindle end of the spindle extending outside the top end of the sleeve, and a pin removably mounted in one of the spindle holes to thereby limit the slidable motion of the spindle in the sleeve.

11. The invention of claim 10, wherein the sleeve has an upper edge comprising a cam surface, the pin bearing against the cam surface as a cam follower to urge the spindle in a predetermined orientation with respect to the load frame.

12. A device for reducing a load on a motor vehicle trailer hitch in combination with a rigid trailer frame comprising:
   (a) a load frame, the load frame having a top side, a bottom side, a forward portion and a rear portion, a spindle mount mounted on the load frame comprising a sleeve having a top end, a cam surface on the top end, a spring saddle on the load frame, a retraction arm attached to the front portion of the load frame pivotally connected to the trailer frame;
   (b) a wheel assembly comprising a spindle connected to a tire support, the spindle rotatably and slidably mounted in the sleeve, a tire rotatably mounted on the tire support, a spring seat mounted on the wheel assembly; and
   (c) a spring coupled between the wheel assembly and the load frame, the spring mounted on the spring saddle and bearing against the spring seat;
   (d) a retracting apparatus fixably mounted to the trailer frame and having an adjustment member connected to the retracting arm and adjustable against the load frame, to thereby control and limit the pivot of the load frame about the pivotal connection to the trailer frame.

13. The invention of claim 12, wherein the trailer support device further comprises a plurality of holes in the spindle, a pin mounted in one of the holes in the spindle, the pin serving as a cam follower bearing against the cam surface of the sleeve to thereby urge the spindle in a predetermined orientation with respect to the load frame.

* * * * *